May 3, 1949.  E. C. WAHLBERG  2,469,139
ELECTRIC MOTOR CONTROL SYSTEM
Filed April 28, 1945  2 Sheets-Sheet 1

INVENTOR.
Eric C. Wahlberg
BY Thomas C. Betts
His ATTORNEY.

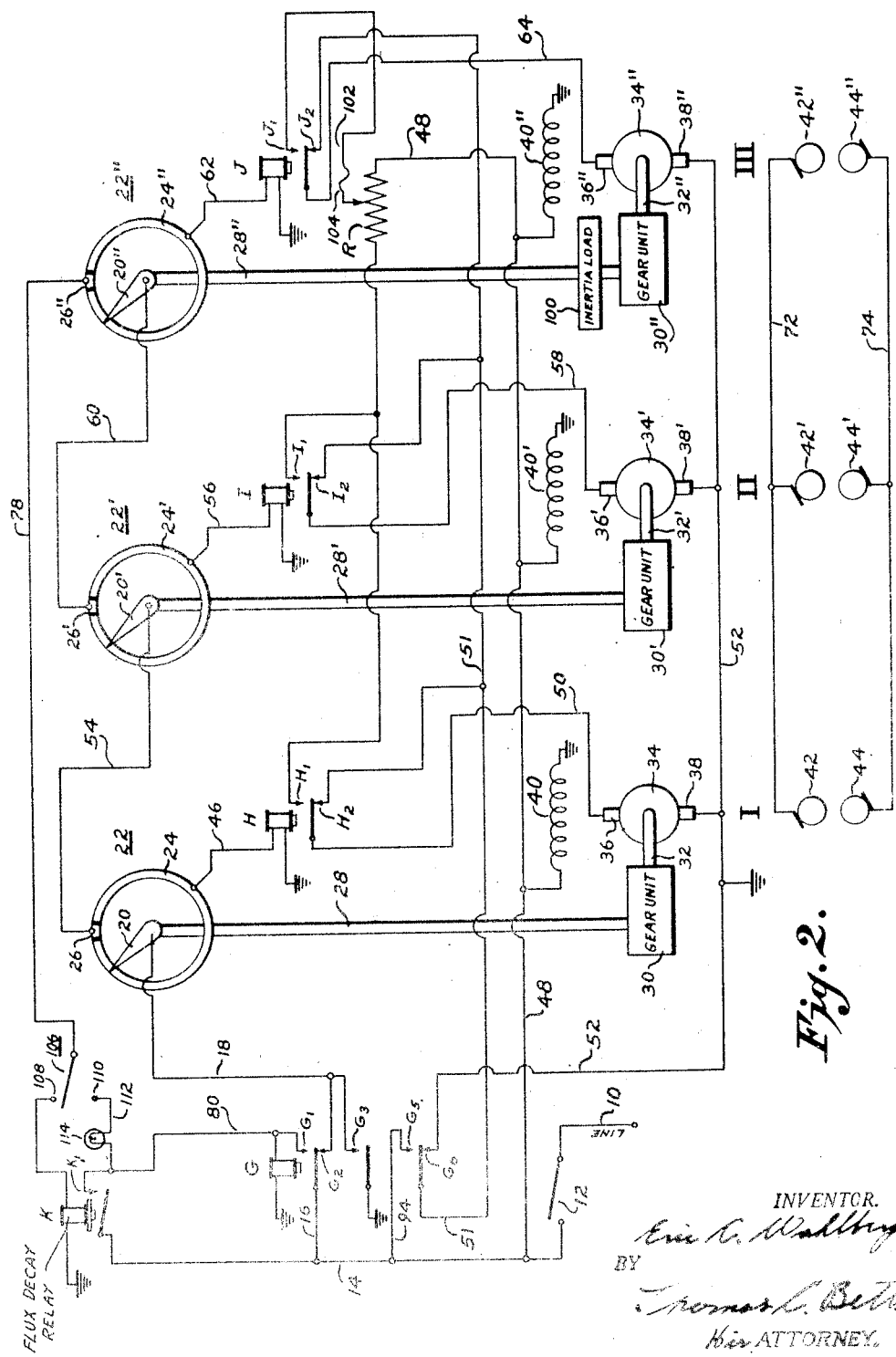

Patented May 3, 1949

2,469,139

UNITED STATES PATENT OFFICE 2,469,139

ELECTRIC MOTOR CONTROL SYSTEM

Eric C. Wahlberg, Stamford, Conn., assignor to Electrolux Corporation, Old Greenwich, Conn., a corporation of Delaware Application April 28, 1945, Serial No. 590,820

25 Claims. (Cl. 318—437)

My invention relates to an electric system and more particularly to a system including a plurality of preferably synchronous electric motors, each driving a gear reduction unit. In certain applications of such a system, such as for driving scanning discs in television and radar equipment, it is essential that the output shafts of the several gear units not only be driven in synchronism with each other, but also start from certain predetermined angular positions with respect to each other.

In my Patents Nos. 2,399,272 and 2,399,273, both granted on April 30, 1946, as well as in Patent No. 2,360,856, granted October 24, 1944 to F. C. Doughman and myself, there are shown systems including a plurality of electric motors with means for causing the motor shafts to be angularly positioned before starting, and to start, run and stop in synchronism. Such a system would be ideal for operating scanning discs, provided the discs could be directly driven by the motor shafts without any gear reduction, inasmuch as the shafts may be angularly aligned before the motors are started. However, the low speed at which it is necessary to rotate scanning discs makes it impractical to drive them directly, and hence, gear reduction units are necessary, and if the armature shaft of one motor makes a different number of revolutions than the shafts of the other motors, the output shafts of the gear units will not be in proper angular alignment, even though the armature shafts themselves are properly aligned.

It has been found in practice that, with motors of this type, the shaft of one motor may occasionally during stopping make one revolution more or less than the shafts of the other motors. For most applications where direct drive is possible this is of no importance, inasmuch as the shafts are brought into proper alignment each time the motors are started, and even for applications involving gear reductions, it usually is of but minor moment, because the occasional over or under runs of one revolution are apt to compensate and cancel out rather than accumulate, and hence if absolute angular positioning of the output shafts at all times is not essential, such a system will operate entirely satisfactorily if the angular positions of the output shafts are occasionally checked and if necessary, the output shafts realigned manually.

However, scanning discs must be perfectly aligned at all times during operation, and it is the object of my present invention to provide means for automatically obtaining such alignment of the output shafts of the gear reduction units. In accordance with my invention the closing of a single switch first causes the several motors to run independently of each other until the output shafts of the respective gear reduction units are brought into proper angular alignment, and thereafter without further manual manipulation the motors start and run in synchronism as long as the switch remains closed.

Further objects and advantages of my invention will be apparent from the following description considered in connection with the accompanying drawings, of which:

Fig. 2 is a wiring diagram of another embodiment, particularly adapted for use in a system in which one of the motors drives a substantially greater load than the other.

Figure 1:
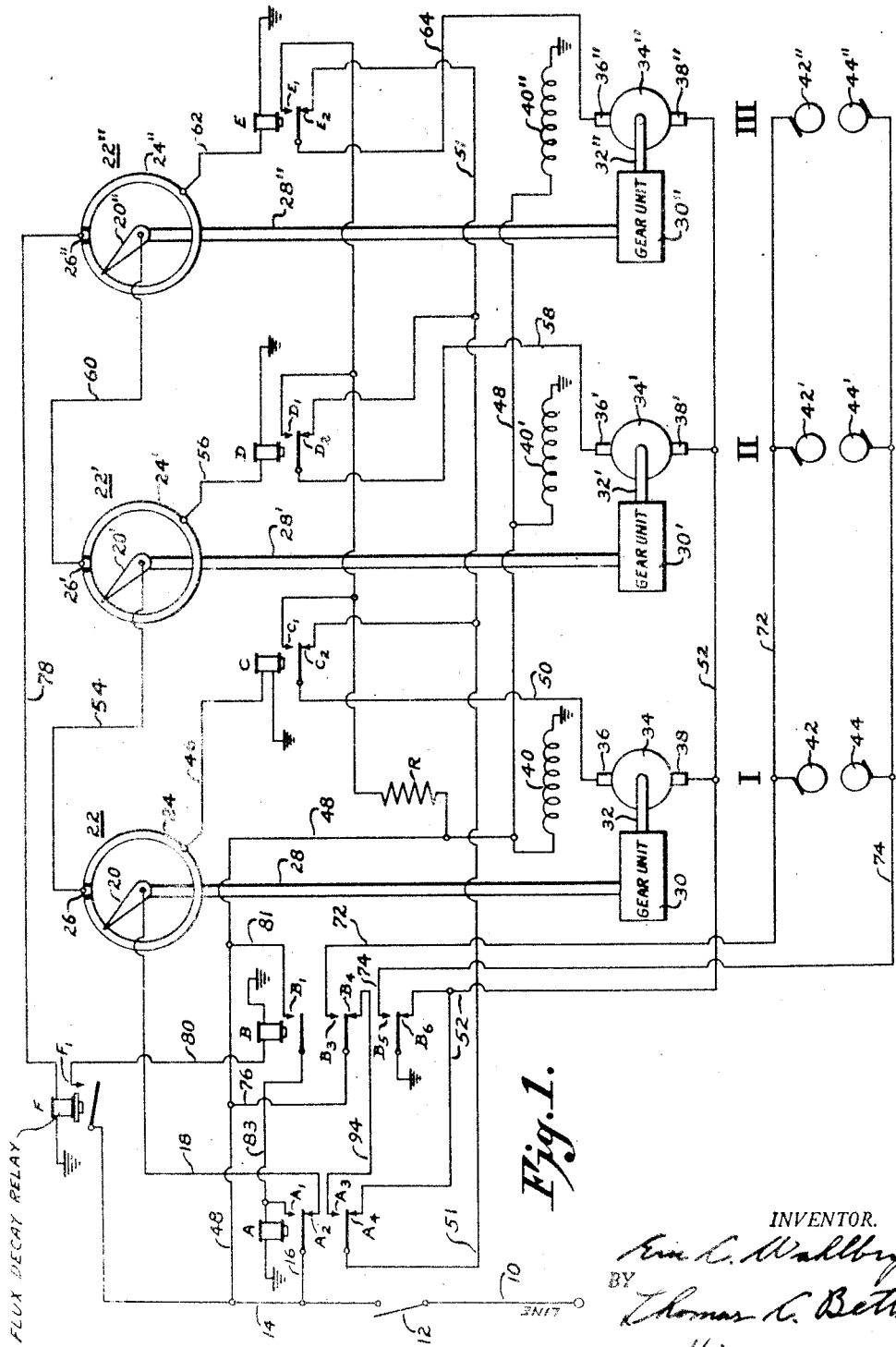
Fig. 1 is a wiring diagram showing one embodiment of my invention.

Referring to Fig. 1, reference character 10 designates a conductor which is connected to one side of any suitable source of electric current, the other side of which is grounded. Conductor 10 is connected through a manually operable switch 12 with a conductor 14. A conductor 16 connects conductor 14 with a contact arm of a magnetic relay designated generally by reference character A. This relay is provided with two contact arms which cooperate with normally open contacts $A_1$ and $A_3$, and normally closed contacts $A_2$ and $A_4$. Contact $A_2$ is connected by means of a conductor 18 with the rotary element 20 of a rotary switch designated generally by reference character 22. The stationary element of this switch comprises a large segment 24 and a small segment 26. The rotary element 20 is mounted to be driven at a one to one ratio by the output shaft 28 of a gear reduction unit 30.

This gear unit is driven by the armature shaft 32 of an electric motor designated generally by reference character I. This motor includes an armature diagrammatically shown at 34 which has the usual commutator cooperating with brushes 36 and 38, and a field winding 40. The armature also includes a pair of slip rings 42 and 44 which are connected to spaced points in the armature winding, in the manner particularly disclosed in my aforesaid Patent No. 2,399,273.

The larger segment 24 of rotary switch 22 is connected by means of a conductor 46 with one side of the solenoid of a magnetic relay C, the other side of which is grounded. This relay has a single contact arm which cooperates with a normally open contact $C_1$ and a normally closed contact $C_2$. Contact $C_1$ is connected through a resistance R and a conductor 48 with the conductor 14. The contact arm of relay C is connected through a conductor 50 with the brush 36 of motor I. Contact C2 is connected through a conductor 51 with the arm of relay A which cooperates with contacts A3 and A4. Contact A4 is connected through a conductor 52 with the commutator brush 38 of motor I as well as with corresponding brushes 38' and 38'' of similar motors II and III.

The smaller segment 26 of the switch 22 is connected through a conductor 54 to the rotating element 20' of a rotary switch 22', which element is driven at a one to one ratio by the output shaft 28' of gear reduction unit 30' which is driven by motor II. The larger segment 24' of switch 22' is connected through a conductor 56 with one side of the solenoid of a magnetic relay D, the other side of which is grounded. This relay has a single contact arm which cooperates with a normally open contact D1 and a normally closed contact D2. The contact arm is connected through a conductor 58 with the commutator brush 36' of motor II. Contact D1 is connected through resistance R and conductor 48 with the line 14, while contact D2 is connected to conductor 51.

The smaller segment 26' of switch 22' is connected through a conductor 60 with the rotating element 20'' of a rotary switch 22''. This rotary element is driven at a one to one ratio by the output shaft of a gear reduction unit 30'' driven by the motor III. The larger segment 24'' is connected through conductor 62 with one side of the solenoid of a relay E, the other side of which is grounded. This relay has a single contact arm which is connected to the commutator brush 36'' of the motor III through conductor 64. This contact arm cooperates with a normally open contact E1 which is connected through resistance R and conductor 48 to the line 14, and with a normally closed contact E2 which is connected to conductor 51.

One side of each field winding of the motor is grounded, while the other side of each winding is connected through conductor 48 with conductor 14. The corresponding slip rings of the motors are connected in parallel by means of conductors 72 and 74, which conductors are also connected to normally open contacts B3 and B5, respectively, of a magnetic relay B. The contact arm of this relay which cooperates with contact B3 is connected through conductors 76 and 48 to the line 14, while the contact arm which cooperates with contact B5 is grounded.

The smaller segment 26'' of switch 22'' is connected through a conductor 78 with one side of the solenoid of a flux decay relay F, the other side of which is grounded. As is well known, a relay of this type picks up its contact arm as soon as the solenoid is supplied with current, but continues to hold the arm for a predetermined length of time after the supply of current to the solenoid is interrupted. Relay F has a single contact arm which cooperates with a normally open contact F1. The arm is connected to conductor 14 while the contact F1 is connected through conductor 80 with one side of the solenoid of magnetic relay B, the other side of which is grounded.

Contact B1 is connected through conductors 81 and 48 with conductor 14, while the contact arm which cooperates with B1 is connected through conductor 83 with one side of the solenoid of relay A, the other side of which is grounded. Contact A1 is also connected to conductor 83, thus providing a holding circuit for this relay.

As previously stated, the normally open contacts B3 and B5 are connected to conductors 72 and 74. Normally closed contact B4 is connected through a conductor 94 with the normally open contact A3, while the normally closed contact B6 is connected through conductor 52 to the commutator brushes 38, 38', and 38'' of the motors.

The above described device operates as follows:

With the switch 12 open, all of the relays will occupy the deenergized positions shown in the wiring diagram, and all the circuits will be open.

It will first be assumed that several motors have stopped with rotating elements 20, 20', and 20'' of the respective switches in contact with the larger segments 24, 24', and 24''. In all probability, the output shaft of the several gear units will be in substantially angular alignment, but they may not be in exact alignment. When switch 12 is closed it supplies excitation current to the field winding 40, 40', and 40'' through connected conductors 14 and 48. When the switch 12 is closed it also completes a circuit through conductor 16, normally closed contact A2, conductor 18, switch element 20, larger segment 24 and conductor 46 to energize relay C, which consequently opens contact C2 and closes C1. Closing of contact C1 connects brush 36 of motor I with conductor 14 through conductor 50, resistance R and conductor 48. Inasmuch as the other brush 38 of motor I is connected to ground through conductor 52 and contact B6, the armature is supplied with current which, however, due to resistance R is at lower than line voltage. Hence, the motor I operates at reduced speed, thus rotating switch element 20 through gear reduction 30 until the element 20 leaves the larger segment 24 and makes contact with smaller segment 26. Operation of the motors at reduced speed during positioning is desirable for two reasons. In the first place, it tends to prevent overtravel of the element 20, and in the second place it makes it possible to operate motor I while the remaining motors are stationary without necessitating opening the circuits between the slip rings of the various motors. Inasmuch as the fields of all the motors are excited the armatures of motors II and III would tend to follow the armature of motor I even at this reduced speed of operation, but they are prevented from doing so because the commutator brushes are short circuited. Thus, brush 36' is connected through conductor 58, contact D2, conductor 51, contact A4, and conductor 52 with brush 38' of the same motor. In similar manner brushes 36'' and 38'' of motor III are short circuited through contact E2.

As soon as element 20 leaves segment 24, relay C is deenergized, thereby opening contact C1 so as to interrupt the supply of armature current, and closing contact C2 so as to short circuit the armature of motor I. Inasmuch as field 40 remains excited, the motor is dynamically braked so as to stop almost instantaneously which, coupled with the fact that the motor was operating at reduced speed, effectively prevents any overtravel and precisely indexes the angular position of the output shaft 28.

When the rotating element 20 of switch 22 contacts the smaller segment 26 a circuit is established from conductor 14 through conductor 16, contact A2, conductor 18, element 20, segment 26, conductor 54, element 20', segment 24', and conductor 56 to energize the solenoid of the relay D. This causes motor II to operate in a manner similar to that described in connection with motor I until element 20' leaves segment 24' and contacts segment 26'. Motor II is then almost instantaneously stopped so as to index the output shaft 28' in proper angular position.

The circuit previously traced from conductor 14 to element 20' is then continued through segment 26', conductor 60, rotary element 20", segment 24" and conductor 62 to energize relay E. This results in the operation of motor III in the same manner as previously described until the switch element 20" leaves segment 24" and contacts segment 26", whereupon the motor is stopped. Consequently, all of the output shafts of the gear reduction units have been turned to exactly the same angular position.

When the switch element 20" contacts switch element 26" the circuit previously traced from conductor 14 is continued through conductor 78 so as to energize relay F. This closes contact $F_1$, thus energizing relay B from conductor 14 through conductor 80. Closing of contact $B_3$ connects the slip rings 42, 42', and 42" to the line 10 through conductors 72, 76, and 48, while closing of contact $B_5$ connects slip rings 44, 44', and 44" to ground through conductor 74. Thus, the slip rings are connected in parallel across the power supply, while the opening of contacts $B_4$ and $B_6$ maintains the armature brushes disconnected from the power supply. As is explained in my aforesaid patents, supplying current from the line to the slip rings, produces fixed magnetic poles in the armatures which cause the armatures to line up in predetermined angular positions with respect to their stationary fields and hence, with respect to each other. This positioning of the armature shafts is preferable, even though the output shafts of the gear units have been positioned because, if the gear ratio is high, the output shafts may not be indexed or positioned precisely enough to accurately align the armature shafts, and it is characteristic of motors of this type that if their armature shafts are not properly aligned before starting, they may be subject when started to undesirable hunting before they come into synchronism.

Closing of contact $B_1$ supplies current through conductors 14, 48, 81 and 83 to energize relay A. Closure of contact $A_1$ provides a holding circuit through conductor 16 for relay A, and consequently this relay remains energized as long as switch 12 remains closed even though contact $F_1$ is open. This contact will open because the circuit from conductor 14 to the solenoid of relay F is interrupted by the opening of $A_2$. However, contact $F_1$ does not immediately open, due to the time delay characteristic of the relay F, but remains closed long enough to permit positioning of the armatures and to assure that contact $A_1$ will be closed to provide for the aforesaid holding circuit of the A relay. Closure of contact $A_3$ has no immediate effect inasmuch as contact $B_4$ is open, while opening of contact $A_4$ removes the short circuit of the commutator brushes.

Upon the lapse of a predetermined interval, usually a few seconds, following the interruption of the circuit to the solenoid of the flux decay relay F by the opening of contact $A_2$, the contact $F_1$ opens so as to deenergize relay B. This opens contacts $B_3$ and $B_5$ so as to disconnect the slip rings from the line 10 and ground, respectively. Contact $B_1$ is also opened, but this does not drop out the A relay, because its own holding circuit is closed through contact $A_1$. Contacts $B_4$ and $B_6$ are closed by the deenergization of solenoid B with the result that conductor 51 is connected to the line 10 through contact $A_3$, conductor 94, contact $B_4$, and conductors 76 and 48. Inasmuch as commutator brushes 36, 36', and 36" are connected to conductor 51 through contacts $C_2$, $D_2$, and $E_2$, respectively, these brushes are now connected to the line, while brushes 38, 38', and 38" are grounded through conductor 52 and contact $B_6$. The armatures are hence connected in parallel across the power supply and, therefore, the motors start and run. During starting and running the motors are held in synchronism with respect to each other by virtue of the tie provided by the conductors 72 and 74 between the slip rings as is clearly explained in my aforesaid patents. Inasmuch as the motors operate in synchronism, their output shafts 28, 28', and 28" will likewise rotate in synchronism and hence, scanning discs or the like driven thereby will be maintained in synchronism.

The motors operate in this manner as long as desired and may be stopped by merely opening the switch 12. Opening of this switch interrupts the supply of current to the relay A, thus opening contacts $A_1$ and $A_3$, and closing contacts $A_2$ and $A_4$. Opening of $A_1$ merely opens the holding circuit for relay A, thus conditioning this circuit for the next starting. Opening of contact $A_3$ interrupts the supply of current from the line 10 to the brushes 36, 36', and 36" of the motors. Closure of contact $A_2$ completes the circuit from conductor 14 through the rotary element 20 of switch 22 but this has no effect as the switch 12 is open and hence conductor 14 is disconnected from the line. Closure of contact $A_4$ short circuits the armatures, inasmuch as the brushes 38, 38', and 38" are connected through the conductor 52, contact $A_4$, conductor 51, and contacts $C_2$, $D_2$, and $E_2$, and conductors 50, 58, and 64, respectively, with the brushes 36, 36', and 36". This establishes the dynamic braking circuits previously described.

In the event that the motors should be stopped with all of the rotary elements 20, 20', and 20" in contact with the smaller segments 26, 26', and 26", respectively, the next time the switch 12 is closed relay F would be immediately energized and the armature shafts would be positioned, and the motors would start and run in synchronism without any preliminary positioning of the output shafts. This is entirely satisfactory, inasmuch as the fact that the rotating elements are all in contact with the smaller segments indicates that the output shafts were properly indexed when the motors stopped.

If one or more but not all of the rotating elements are in contact with the respective smaller segments, the indexing operation of output shafts driving such elements will be omitted, while the remaining output shafts will be indexed in the manner first described, whereafter all the armature shafts will be positioned and the motors will start and run in synchronism. It will thus be seen that, regardless of the angular positions in which the output shafts may come to rest whenever the motors are stopped, these shafts will be automatically aligned immediately before the motors are next started.

In certain applications of the above described system, notably for operating radar equipment, one of the motors is required to drive an inertia load which is substantially greater than that driven by the remaining motors, and it has been found that after the output shafts have been properly positioned, difficulty is experienced in starting the several motors in synchronism. Due to the relatively greater inertia load carried by one of the motors, this motor tends to lag behind the others, thus causing undesirable hunting before the motors get into synchronism.

The system shown in Fig. 2 overcomes this difficulty. In this system the motors are individually positioned as before, the motor driving the inertia load being the last to be positioned. Moreover, a higher voltage is used for driving this last motor during positioning than is impressed on the normally loaded motors, and when the output shaft of the last motor has been positioned, the remaining motors are started without stopping the last motor. Thus the inertia load of the last motor has been largely overcome at the instant when the motors are started in synchronism, and consequently hunting is avoided.

Referring to Fig. 2 reference character 10 designates a line conductor which is connected through a manually operable switch 12 to a conductor 14. Conductor 16 connects conductor 14 with the contact arm of a magnetic relay G which arm cooperates with contacts $G_1$ and $G_2$. Contact $G_2$ is connected through the conductor 18 with the rotary element 20 of the rotary switch 22. As was described in connection with Fig. 1, this switch includes a large segment 24 and a small segment 26. The rotary element is driven by the output shaft 28 of a gear reduction unit 30 which is driven by the armature shaft 32 of the motor I. This motor has commutator brushes 36 and 38, and slip rings 42 and 44 connected to spaced points in the armature winding. The field 40 is connected to the conductor 14 through conductor 48.

The larger segment 24 of the rotary switch is connected through conductor 46 with the solenoid of a magnetic relay H having a single contact arm cooperating with contacts $H_1$ and $H_2$. The arm is connected through conductor 50 with the brush 36 of motor I, while contact $H_1$ is connected through resistance R and conductor 48 with conductor 14. The contact $H_2$ is connected through conductor 51 with the contact arm of relay G which cooperates with contacts $G_5$ and $G_6$. Contact $G_6$ is connected through a conductor 52 with the brush 38 of motor I, as well as with the corresponding brushes of the remaining motors. Conductor 52 is also permanently connected to ground. Contact $G_5$ is connected through a conductor 94 with conductor 14.

The smaller segment of switch 22 is connected by means of a conductor 54 with the rotary element 20' of the switch 22'. This rotary element is driven by the output shaft 28' of the gear unit 30' which is driven by the motor II. The larger segment 24' of the switch is connected through conductor 56 with the solenoid of a magnetic relay I having a contact arm cooperating with contacts $I_1$ and $I_2$. The arm is connected by a conductor 58 with a brush 36' of the motor II. Contact $I_1$ is connected through resistance R and conductor 48 with conductor 14 while contact $I_2$ is connected to conductor 51.

The smaller segment 26' of switch 22' is connected through conductor 60 with the rotary element 20" of the switch 22". This rotary element is driven by the output shaft 28" of the gear unit 30". The shaft also drives a load 100, designated on the drawing as an inertia load, which is substantially greater than the loads driven by the other output shafts. The larger segment 24" is connected through conductor 62 with the solenoid of a relay J having a contact arm cooperating with contacts $J_1$ and $J_2$. The arm is connected through conductor 64 with brush 36" of motor III. Contact $J_2$ is connected to conductor 51, and contact $J_1$ is connected through a conductor 102 with an adjustable contact 104 on the resistance R. Corresponding slip rings of the several motors are connected in parallel by means of the conductors 72 and 74.

The smaller segment 26" of switch 22" is connected through conductor 78 to the blade or other movable member of a single pole, double throw switch 106 having contacts 108 and 110. Contact 108 is connected to the solenoid of a flux decay relay K having a single contact arm which cooperates with a normally open contact $K_1$. This contact is connected by means of a conductor 80 with the solenoid of relay G and also with contact $G_1$. The arm of relay K is connected to conductor 14.

Contact 110 of switch 106 is connected through a conductor 112 with conductor 80 and a suitable audible, visible or other signal device, such as the lamp 114, is interposed in conductor 112. Relay G has a contact arm which is grounded and which cooperates with the normally open contact $G_3$, which contact is connected to conductor 18.

The above described system operates as follows:

In starting, the switch 106 should be closed in its upper position so as to connect conductor 78 through contact 108 with the solenoid of relay K. Switch 12 is then closed, whereupon current flows through conductors 14 and 16, contact $G_2$, and conductor 18 to the rotary element 20 of switch 22. If this element is in contact with segment 24, the circuit is completed through this segment and conductor 46 to the solenoid of relay H. This relay is actuated so as to open contact $H_2$ and close contact $H_1$. Consequently, brush 36 of motor I is connected through conductor 50, contact $H_1$, resistance R, and conductor 48 with conductor 14. Inasmuch as the other brush is permanently connected through conductor 52 with ground, the motor I is caused to operate and will run at a reduced speed because of the inclusion of resistance R in its armature circuit. Contact 20 is thus driven until it leaves segment 24 and contacts segment 26. When this occurs, the circuit to relay H is open, and consequently contact $H_1$ opens and contact $H_2$ closes. Opening of contact $H_1$ interrupts the supply of current to the armature while closing of contact $H_2$ short circuits the armature, inasmuch as brush 36 is connected through conductor 50, contact $H_2$, conductor 51, contact $G_6$, and conductor 52 with the other brush 38. Hence, this motor is dynamically braked so as to prevent the possibility of overtravel of the rotary element 20.

When this element contacts segment 26 the circuit is completed through conductor 54, rotary element 20', segment 24', and conductor 56 to relay I. Actuation of this relay drives motor II at a reduced speed in the same manner as described in connection with motor I. When element 20' leaves segment 24' and contacts 26', motor II is stopped and dynamically braked.

When smaller segment 26' is contacted by the element, the circuit is completed through conductor 60, rotary element 20", segment 24", and conductor 62 to relay J. Actuation of this relay closes contact $J_1$ and opens contact $J_2$. Closing of contact $J_1$ connects brush $36''$ of motor III through conductor $64$, contact $J_1$, conductor $102$ and more or less of resistance R with conductor $48$ and hence, with conductor $14$. The position of contact $104$ on resistance R is so adjusted that sufficient voltage is impressed on motor III to cause it to accelerate under the additional load $100$ at about the same rate that the other motors are accelerated without this load. Motor III thus drives rotary element $20''$ until the latter leaves $24''$ and contacts segment $26''$. When this occurs the relay J is deenergized but the closing of contact $J_2$ does not dynamically brake motor III because the circuit across the brushes $36''$ and $38''$ is simultaneously opened at contact $G_6$, as will be explained. When rotary element $20''$ contacts segment $26''$, the circuit is completed through conductor $78$ and contact $108$ of switch $106$ to the solenoid of relay K, thus closing the contact $K_1$. This connects the solenoid of relay G to conductor $14$ through conductor $80$ and contact $K_1$, thus energizing relay G. This results in the opening of contact $G_2$ and the closing of $G_1$, the latter contact providing a holding circuit for the relay G. Opening of contact $G_2$ opens the circuit to the solenoid of relay K, but the time delay characteristic of this relay causes it to hold long enough to insure that contact $G_1$ will be closed.

Actuation of the G relay opens contact $G_6$ so as to remove the short circuit across the armature brushes of the several motors, while the closing of contact $G_5$ connects conductor $51$ to conductor $94$ and hence, to conductor $14$. Thus, full line voltage is supplied from conductor $14$ through contacts $H_2$, $I_2$, and $J_2$ to the brushes $36$, $36'$, and $36''$ of the several motors. Hence, motors I and II start while motor III is still running and therefore, this latter motor does not have to pick up its inertia load during the synchronous starting of the motors. As a result, all of the motors are able to start and run in synchronism without objectional hunting.

If it is desired to ascertain definitely that the various output shafts are operating in proper angular phase relationship, the switch $106$ may be closed in its lower position so as to connect conductor $78$ through contact $110$ with conductor $112$. This establishes a circuit from conductor $14$ through conductor $16$, contact $G_1$, conductor $80$, lamp $114$, switch $106$, and conductor $78$ to the smaller segment $26''$ of rotary switch $22''$. While the rotary elements of the several switches are in contact with the larger segments, this circuit will not be completed to ground, but if each of the rotary elements contacts the respective smaller segments simultaneously the circuit will be completed from segment $26''$ through rotary element $20''$, conductor $60$, segment $26'$, rotary element $20'$, conductor $54$, segment $26$, element $20$, conductor $18$, and contact $G_3$ to ground. This will cause the lamp $114$ to light as long as all of the rotary elements are in contact with the respective smaller segments. However, if one or more of the output shafts is out of proper angular phase relationship, all of the rotary elements will not contact their respective smaller segments at the same time and the lamp $114$ will not light. Consequently, if when the switch $106$ is closed in its lower position the lamp $114$ lights periodically it indicates that the output shafts are in proper angular phase relationship, while if it fails to light, it indicates that this relationship does not obtain. In the latter event, the operator should shut down the sytem by opening switch $12$ and then start it up again, after having thrown the switch $110$ to its upper position.

The above described tell-tale or indicating system could be employed in connection with the circuit shown in Fig. 1 and in most instances it would be highly desirable. However, it is particularly desirable in connection with the system shown in Fig. 2 for the reason now to be described. Should it occur that all of the motors should stop with the rotary elements in contact with the smaller segments of the rotary switches, when they are next started up again all of the armature would be immediately and simultaneously connected across the line and hence, they would all have to start from standstill together and without the motor III having had the opportunity to overcome its inertia load during the positioning step. Consequently, the motors would be likely to hunt during starting, and before settling down to synchronous operation the motors might make different numbers of revolutions so that their output shafts would not be in proper angular phase relationship with each other. However, this would be immediately apparent through the failure of the lamp $114$ to light periodically upon the closing of switch $106$ in its lower position, whereupon the operator should shut down the system and start it up again. Inasmuch as the smaller segments of the rotary switches subtend arcs of only about $5°$, which is $1/72$ of a circle, the chances of the rotary element stopping on the smaller segments is only one in seventy-two. Hence, it would not be likely for them to stop on the smaller segments twice in succession, but if they did it would only be necessary to stop and start the system again.

No harm would be done if the operator attempted to start the system with the switch $106$ in its lowermost position. If this occurred, the motors I and II would be operated so as to properly position their output shafts, but when the output shaft of the motor III were turned to bring the rotary element $20''$ into contact with the segment $26''$, the circuit from the line would be completed through conductor $78$, contact $110$, switch $106$, conductor $112$, lamp $114$, conductor $80$, and the solenoid of relay G to ground. Thus, the lamp $114$ and the solenoid of relay G would be in series. This would cause the lamp to glow steadily, but dimly while the voltage available at the relay G probably would not be sufficient to actuate this relay, or if it was, contact $G_2$ would be opened to interrupt the circuit through the rotary switches before the contact $G_1$ could close to provide a holding circuit, and the contact arms of the relay G would vibrate like a buzzer and the lamp $114$ would flicker. Thus, either a steady dim glow or a rapid flicker of the lamp $114$ indicates that the switch $106$ is in the wrong position during starting and hence, the operator should shut the system down and then start it up again with the switch $106$ in the proper position.

In both systems I have shown three motors, but obviously a smaller or greater number could be connected in the same manner. Also, for simplicity I have shown the motors and relays as being supplied from the same source of current, but this of course, is not necessary and separate sources could be employed.

While I have shown and described two more or less specific embodiments of my invention it is to be understood that this has been done for the purpose of illustration only, and that the scope of my invention is not to be limited thereby, but is to be determined from the appended claims.

What I claim is:

1. In an electrical system, a plurality of electric motors, a gear reduction unit driven by each motor, each unit having an output shaft, a source of electric current, switching means for controlling said current, individual automatic means responsive to actuation of said switching means for operating each of said motors individually and non-synchronously until said output shafts are turned to predetermined angular positions, and automatic means for thereafter operating said motors in synchronism.

2. In an electrical system, a plurality of electric motors, a gear reduction unit driven by each motor, each unit having an output shaft, a source of electric current, switching means for controlling said current, individual automatic means responsive to actuation of said switching means for starting each of said motors individually, means for stopping each of said motors when the output shaft of the respective gear unit has been turned to a predetermined angular position, and automatic means for thereafter operating said motors in synchronism.

3. In an electrical system, a plurality of electric motors, a gear reduction unit driven by each motor, each unit having an output shaft, a source of electric current, switching means for controlling said current, individual automatic means responsive to actuation of said switching means for supplying current to each of said motors individually to cause the motors to run, means responsive to the turning of the output shaft of each gear unit to a predetermined angular position for interrupting the supply of current to the respective motor and for dynamically braking said respective motor, and means operative when all of said output shafts have been turned to the predetermined angular positions for operating said motors in synchronism.

4. In an electrical system, a plurality of electric motors, a gear reduction unit driven by each motor, each unit having an output shaft, a source of electric current, switching means for controlling said current, individual automatic means responsive to actuation of said switching means for operating said motors individually and in sequence until the output shaft of each gear unit is turned to a predetermined angular position, and automatic means for thereafter operating said motors in synchronism.

5. In an electrical system, a plurality of electric motors, a gear reduction unit driven by each motor, each unit having an output shaft, a source of electric current, switching means for controlling said current, individual automatic means responsive to actuation of said switching means for operating each of said motors individually until said output shafts are turned to a predetermined angular position, automatic means for thereafter turning the armature of said motors to predetermined angular positions, and automatic means for thereafter starting and running said motors in synchronism.

6. In an electrical system, a plurality of electric motors, a gear reduction unit driven by each motor, each unit having an output shaft, a source of electric current, switching means for controlling said current, individual automatic means responsive to actuation of said switching means for supplying current to each of said motors individually to cause the motors to run, means responsive to the turning of the output shaft of each gear unit to a predetermined angular position for interrupting the supply of current to the respective motor and for dynamically braking said respective motor, automatic means for thereafter turning the armatures of said motors to predetermined angular positions, and automatic means for thereafter starting and running said motors in synchronism.

7. In an electrical system, a plurality of electric motors, a gear reduction unit driven by each motor, each unit having an output shaft, a source of electric current, switching means for controlling said current, individual automatic means responsive to actuation of said switching means for operating each of said motors individually and at non-synchronous reduced speed until said output shafts are turned to predetermined angular positions, and automatic means for thereafter operating said motors in synchronism at normal speed.

8. In an electrical system, a plurality of electric motors, a gear reduction unit driven by each motor, each unit having an output shaft, a source of electric current, switching means for controlling said current, individual automatic means responsive to actuation of said switching means for starting each of said motors individually and running it at a reduced speed, means for stopping each of said motors when the output shaft of the respective gear unit has been turned to a predetermined angular position, and automatic means for thereafter operating said motors in synchronism at normal speed.

9. In an electrical system, a plurality of electric motors, a gear reduction unit driven by each motor, each unit having an output shaft, a source of electric current, switching means for controlling said current, automatic means responsive to actuation of said switching means for supplying current to each of said motors individually and at a voltage less than the normal voltage of said source to cause the motors to run at reduced speed, means responsive to the turning of the output shaft of each gear unit to a predetermined angular position for interrupting the supply of current to the respective motor, and means operative when all of said output shafts have been turned to the predetermined angular positions for supplying current at full normal voltage to all of said motors for operating them at normal speed.

10. In an electrical system, a plurality of electric motors, a gear reduction unit driven by each motor, each unit having an output shaft, a source of electric current, switching means for controlling said current, automatic means responsive to actuation of said switching means for supplying current to each of said motors individually and at a voltage less than that of said source to cause the motors to run at reduced speed, means responsive to the turning of the output shaft of each gear unit to a predetermined angular position for interrupting the supply of current to the respective motor, and for dynamically braking said respective motor, and means operative when all of said output shafts have been turned to the predetermined angular positions for supplying current at full voltage to all of said motors for operating them at normal speed.

11. In an electrical system, a plurality of electric motors, a gear reduction unit driven by each motor, each unit having an output shaft, a source of electric current, switching means for controlling said current, individual automatic means responsive to actuation of said switching means for operating each of said motors individually and in sequence at a reduced speed until the output shaft of each gear unit is turned to a predetermined angular position, and automatic means for thereafter operating said motors in synchronism at normal speed.

12. In an electrical system, a plurality of electric motors, a gear reduction unit driven by each motor, each unit having an output shaft, a source of electric current, switching means for controlling said current, individual automatic means responsive to actuation of said switching means for operating each of said motors individually and at reduced speed until said output shafts are turned to predetermined angular positions, automatic means for thereafter turning the armatures of said motors to predetermined angular position, and automatic means for thereafter starting and running said motors in synchronism at normal speed.

13. In an electrical system, a plurality of electric motors, a gear reduction unit driven by each motor, each unit having an output shaft, a source of electric current, switching means for controlling said current, automatic means responsive to actuation of said switching means for supplying current to each of said motors individually and at a voltage less than the normal voltage of said source to cause the motors to run at reduced speed, means responsive to the turning of the output shaft of each gear unit to a predetermined angular position for interrupting the supply of current to the respective motor, and for dynamically braking said respective motor, means operative when all of said output shafts have been turned to the predetermined angular positions for turning the armatures of said motors to predetermined angular positions and means for thereafter supplying current at full normal voltage to all of said motors for operating them at normal speed.

14. In an electrical system, a plurality of electric motors, a gear reduction unit driven by each motor, each unit having an output shaft, a rotary switch driven by each output shaft, each switch including a rotary element cooperating with a large segment and a small segment, relay means responsive to the completion of a circuit through the rotary element and large segment of each switch for operating the respective motor independently of the remaining motors until the circuit is interrupted by the rotary element leaving the large segment and contacting the small segment, a circuit completed when the rotary elements are in contact with the small segments in all said switches, and relay means responsive to completion of the last-mentioned circuit for operating all of said motors in synchronism.

15. In an electrical system, a plurality of electric motors, a gear reduction unit driven by each motor, each unit having an output shaft, a rotary switch driven by each output shaft, each switch including a rotary element cooperating with a large segment and a small segment, a source of electric current, a resistance, relay means responsive to the completion of a circuit through the rotary element and large segment of each switch for connecting the respective motor to said source of current through said resistance for operating said respective motor at a reduced speed and independently of the remaining motors until the circuit is interrupted by the rotary element leaving the large segment and contacting the small segment, a circuit completed when the rotary elements are in contact with the small segments in all said switches, and relay means responsive to completion of the last-mentioned circuit for connecting all of said motors directly to said source of current.

16. In an electrical system, a plurality of electric motors, a gear reduction unit driven by each motor, each unit having an output shaft, a rotary switch driven by each output shaft, each switch including a rotary element cooperating with a large segment and a small segment, relay means responsive to the completion of a circuit through the rotary element and large segment of each switch for operating the respective motor independently of the remaining motors until the circuit is interrupted by the rotary element leaving the large segment and contacting the small segment, a circuit completed when the rotary elements are in contact with the small segments in all said switches, a time delay relay actuated by the completion of the last-mentioned circuit, and relay means controlled by said time delay relay for first positioning the armatures of said motors in predetermined angular positions and thereafter operating all of said motors in synchronism.

17. In an electrical system, a plurality of electric motors, a gear reduction unit driven by each motor, each unit having an output shaft, each switch including a rotary element cooperating with a large segment and a small segment, a source of electric current, a resistance, relay means responsive to the completion of a circuit through the rotary element and large segment of each switch for connecting the respective motor to said source of current through said resistance for operating said respective motor at a reduced speed and independently of the remaining motors until the circuit is interrupted by the rotary element leaving the large segment and contacting the small segment, a circuit completed when the rotary elements are in contact with the small segments in all said switches, a pair of slip rings connected to spaced points in the armature of each motor, a time delay relay actuated by the completion of the last-mentioned circuit, and relay means controlled by said time delay relay for first directly connecting said slip rings to said source of current and thereafter directly connecting said commutators to said source of current.

18. In an electric system, a plurality of electric motors, a gear reduction unit driven by each motor, each unit having an output shaft, one of said motors driving a substantially greater load than the remainder of said motors, a source of electric current, switching means for controlling said current, individual automatic means responsive to actuation of said switching means for operating said motors individually and in sequence until the output shaft of each gear unit is turned to a predetermined angular position, the last motor to be operated in said sequence being said one motor, and means responsive to the positioning of the output shaft of the gear unit driven by said one motor for starting the remainder of said motors and for continuing the operation of said one motor.

19. In an electric system, a plurality of electric motors, a gear reduction unit driven by each motor, each unit having an output shaft, one of said motors driving a substantially greater load than the remainder of said motors, a source of electric current, switching means for controlling said current, individual automatic means responsive to actuation of said switching means for operating said remainder of the motors individually until the output shaft of each gear unit driven thereby is turned to a predetermined angular position, means responsive to the positioning of the shafts of the gear units driven by said remainder of the motors for operating said one motor to turn the output shaft of the gear unit driven thereby to a predetermined angular position, and means responsive to the positioning of the last-mentioned shaft for starting said remainder of the motors and for continuing the operation of said one motor.

20. In an electric system, a plurality of electric motors, a gear reduction unit driven by each motor, each unit having an output shaft, one of said motors driving a substantially greater load than the remainder of said motors, a source of electric current, switching means for controlling said current, automatic means responsive to actuation of said switching means for operating said remainder of the motors individually and at reduced voltage until the output shaft of each gear unit driven thereby is turned to a predetermined angular position, means responsive to the positioning of the shafts of the gear units driven by said remainder of the motors for operating said one motor at a voltage higher than said reduced voltage to turn the output shaft of the gear unit driven thereby to a predetermined angular position, and means responsive to the positioning of the last-mentioned shaft for supplying normal voltage to all of said motors to thereby start said remainder of the motors and to continue the operation of said one motor.

21. In an electric system, a plurality of electric motors, a gear reduction unit driven by each motor, each unit having an output shaft, one of said motors driving a substantially greater load than the remainder of said motors, a source of electric current, switching means for controlling said current, automatic means responsive to actuation of said switching means for supplying current to said remainder of the motors to cause the latter to run independently of each other, means responsive to the turning of the output shaft of each gear unit driven by said remainder of the motors to a predetermined angular position for interrupting the supply of current to the respective motor and for dynamically braking said respective motor, means operative when all of the output shafts of said remainder of the motors have been turned to the predetermined angular positions for operating said one motor to turn the output shaft of the gear unit driven thereby to a predetermined angular position, and means responsive to the positioning of the last-mentioned shaft for starting said remainder of the motors and continuing the operation of said one motor.

22. In an electric system, a plurality of electric motors, a gear reduction unit driven by each motor, each unit having an output shaft, one of said motors driving a substantially greater load than the remainder of said motors, a source of electric current, switching means for controlling said current, automatic means responsive to actuation of said switching means for supplying current at a reduced voltage to said remainder of the motors to cause the latter to run independently of each other and at reduced speed, means responsive to the turning of the output shaft of each gear unit driven by said remainder of the motors to a predetermined angular position for interrupting the supply of current to the respective motor and for dynamically braking said respective motor, means operative when all of the output shafts of said remainder of the motors have been turned to the predetermined angular positions for supplying current at a voltage higher than said reduced voltage to said one motor to cause the latter to turn the output shaft of the gear unit driven thereby to a predetermined angular position, and means responsive to the positioning of the last-mentioned shaft for supplying current at normal voltage to all of said motors to thereby start said remainder of the motors and to continue the operation of said one motor.

23. In an electric system, a plurality of electric motors, a gear reduction unit driven by each motor, each unit having an output shaft, one of said motors driving a substantially greater load than the remainder of said motors, a source of electric current, switching means for controlling said current, automatic means responsive to actuation of said switching means for operating said remainder of the motors individually and at reduced voltage until the output shaft of each gear unit driven thereby is turned to a predetermined angular position, means responsive to the positioning of the shafts of the gear units driven by said remainder of the motors for operating said one motor at a voltage higher than said reduced voltage to turn the output shaft of the gear unit driven thereby to a predetermined angular position, means for varying the value of said higher voltage, and means responsive to the positioning of the last-mentioned shaft for supplying normal voltage to all of said motors for starting said remainder of the motors and for continuing the operation of said one motor.

24. In an electrical system, a plurality of electric motors, a gear reduction unit driven by each motor, each unit having an output shaft, a rotary switch driven by each output shaft, each switch including a rotary element cooperating with a large segment and a small segment, relay means responsive to the completion of a circuit through the rotary element and large segment of each switch for operating the respective motor independently of the remaining motors until the circuit is interrupted by the rotary element leaving the large segment and contacting the small segment, a circuit completed when the rotary elements are in contact with the small segments in all said switches, relay means responsive to completion of the last-mentioned circuit for operating all of said motors in synchronism, and means for connecting a signal device into said last-mentioned circuit so as to be actuated by the completion of said circuit during operation of the motors each time said rotary elements simultaneously contact the respective small segments.

25. In an electrical system, a plurality of electric motors, a gear reduction unit driven by each motor, each unit having an output shaft, a rotary switch driven by each output shaft, each switch including a rotary element cooperating with a large segment and a small segment, relay means responsive to the completion of a circuit through the rotary element and large segment of each switch for operating the respective motor independently of the remaining motors until the circuit is interrupted by the rotary element leaving the large segment and contacting the small segment, a circuit completed when the rotary elements are in contact with the small segments in all said switches, relay means responsive to completion of the last-mentioned circuit for operating all of said motors in synchronism, and for deenergizing said last-mentioned circuit, an electric signal device, and means for connecting said device to a source of current through said last-mentioned circuit so said device will be actuated by the completion of said circuit during operation of the motors each time said rotary elements simultaneously contact the respective small segments.

ERIC C. WAHLBERG.

REFERENCES CITED

The following references are of record in the file of this patent:

FOREIGN PATENTS

| Number | Country | Date |
|---|---|---|
| 404,047 | Great Britain | Jan. 11, 1934 |